United States Patent
Wu

(10) Patent No.: US 10,750,526 B2
(45) Date of Patent: Aug. 18, 2020

(54) DEVICE AND METHOD OF HANDLING A SCHEDULING REQUEST

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/006,798

(22) Filed: Jun. 12, 2018

(65) Prior Publication Data

US 2018/0368159 A1 Dec. 20, 2018

Related U.S. Application Data

(60) Provisional application No. 62/519,886, filed on Jun. 15, 2017.

(51) Int. Cl.
| | | |
|---|---|---|
| *H04W 72/12* | (2009.01) | |
| *H04W 74/08* | (2009.01) | |
| *H04W 72/04* | (2009.01) | |
| *H04W 72/14* | (2009.01) | |

(52) U.S. Cl.
CPC ... *H04W 72/1268* (2013.01); *H04W 72/0413* (2013.01); *H04W 72/1284* (2013.01); *H04W 72/14* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2010/0098011 A1* | 4/2010 | Pelletier | H04W 72/1242 370/329 |
| 2015/0003371 A1* | 1/2015 | Park | H04W 52/365 370/329 |
| 2015/0181461 A1 | 6/2015 | Kim | |
| 2017/0202009 A1* | 7/2017 | Kim | H04W 72/1284 |
| 2017/0310433 A1* | 10/2017 | Dinan | H04W 72/048 |
| 2018/0206290 A1* | 7/2018 | Dai | H04W 76/28 |
| 2018/0317123 A1* | 11/2018 | Chen | H04W 28/0278 |
| 2018/0324635 A1* | 11/2018 | Babaei | H04W 28/0278 |

(Continued)

FOREIGN PATENT DOCUMENTS

| | | | |
|---|---|---|---|
| EP | 2854443 A1 | 4/2015 | |
| WO | WO-2018230851 A1 * | 12/2018 | ........ H04W 72/1284 |
| WO | WO-2018232034 A1 * | 12/2018 | ........ H04W 72/1289 |

OTHER PUBLICATIONS

Search Report dated Nov. 15, 2018 for EP application No. 18178094. 1, pp. 1-6.

(Continued)

*Primary Examiner* — Michael J Moore, Jr.
(74) *Attorney, Agent, or Firm* — Winston Hsu

(57) ABSTRACT

A communication device for handling a scheduling request (SR) is configured to execute instructions of: receiving a configuration of a first logical channel (LC), a configuration of a second LC and a first SR configuration associated to the first LC, from a network; triggering the SR; transmitting the SR via at least one physical resource configured by the first SR configuration to the network, if the SR is triggered by first data of the first LC available for a first transmission; and transmitting a random access (RA) preamble for the SR in at least one RA resource to the network, if the SR is triggered by second data of the second LC available for a second transmission.

19 Claims, 3 Drawing Sheets

(56) References Cited

U.S. PATENT DOCUMENTS

2018/0324844 A1* 11/2018 Babaei .................. H04W 74/08
2018/0324872 A1* 11/2018 Babaei .............. H04W 72/1284
2019/0150024 A1* 5/2019 Ye ..................... H04W 72/1205

OTHER PUBLICATIONS

Samsung, "Layer 2 Design for Multiple Services (Numerologies)", 3GPP TSG-RAN WG2 Meeting #96, R2-168851, Nov. 14-18, 2016, Reno, USA, XP051193314, pp. 1-5.

Samsung Electronics R&D Institute UK, "Scheduling Request design for multi-numerology support", 3GPP TSG-RAN WG2 #98, R2-1704573, May 15-19, 2017, Hangzhou, China, XP051263630, pp. 1-2.

Huawei, HiSilicon, "SR triggering and cancellation", 3GPP TSG-RAN WG2 #98, R2-1705198, May 15-19, 2017, Hangzhou, China, XP051275674, pp. 1-3.

Office action dated Mar. 27, 2019 for the Taiwan application No. 107120826, filing date Jun. 15, 2018, p. 1-10.

3GPP TS 36.321 V14.2.0 (Mar. 2017) Technical Specification 3rd Generation Partnership Project; Technical Specification Group Radio Access Network; Evolved Universal Terrestrial Radio Access (E-UTRA); Medium Access Control (MAC) protocol specification (Release 14).

Agenda Item: 2.2 Source: ETSI MCC Title: Report of 3GPP TSG RAN2#98 meetinng, Hangzhou, China Report of 3GPP TSG RAN WG2 meeting #98 Hangzhou, China May 15-19, 2017.

Office action dated Nov. 26, 2019 for EP application No. 18178094. 1, pp. 1-8.

3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release 14)", XP051298198, pp. 1-106.

3GPP TS 36.331 V14.2.2 (Apr. 2017), "3rd Generation Partnership Project; Technical Specification Group Radio Access Network; Evolved Universal Terrestrial Radio Access (E-UTRA); Radio Resource Control (RRC); protocol specification (Release 14)", XP051298184, pp. 1-336, 421-504, 589-672.

* cited by examiner

DEVICE AND METHOD OF HANDLING A SCHEDULING REQUEST

CROSS REFERENCE TO RELATED APPLICATIONS

This application claims the benefit of U.S. Provisional Application No. 62/519,886 filed on Jun. 15, 2017, which is incorporated herein by reference.

BACKGROUND OF THE INVENTION

1. Field of the Invention

The present invention relates to a communication device and a method used in a wireless communication system, and more particularly, to a communication device and a method of handling a scheduling request.

2. Description of the Prior Art

A user equipment (UE) triggers a transmission of a schedule request (SR) to transmit a buffer status report or data. 3rd Generation Partnership Project (3GPP) is discussing enhancement on the transmission of the SR.

SUMMARY OF THE INVENTION

The present invention therefore provides a method and related communication device for handling a scheduling request to solve the abovementioned problem.

A communication device for handling a scheduling request (SR) comprises at least one storage device; and at least one processing circuit, coupled to the at least one storage device. The at least one storage device stores, and the at least one processing circuit is configured to execute instructions of: receiving a configuration of a first logical channel (LC), a configuration of a second LC and a first SR configuration associated to the first LC, from a network; triggering the SR; transmitting the SR via at least one physical resource configured by the first SR configuration to the network, if the SR is triggered by first data of the first LC available for a first transmission; and transmitting a random access (RA) preamble for the SR in at least one RA resource to the network, if the SR is triggered by second data of the second LC available for a second transmission.

A method for handling a scheduling request (SR) for a communication device comprises steps of: receiving a configuration of a first logical channel (LC), a configuration of a second LC and a first SR configuration associated to the first LC, from a network; triggering the SR; transmitting the SR via at least one physical resource configured by the first SR configuration to the network, if the SR is triggered by first data of the first LC available for a first transmission; and transmitting a random access (RA) preamble for the SR in at least one RA resource to the network, if the SR is triggered by second data of the second LC available for a second transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
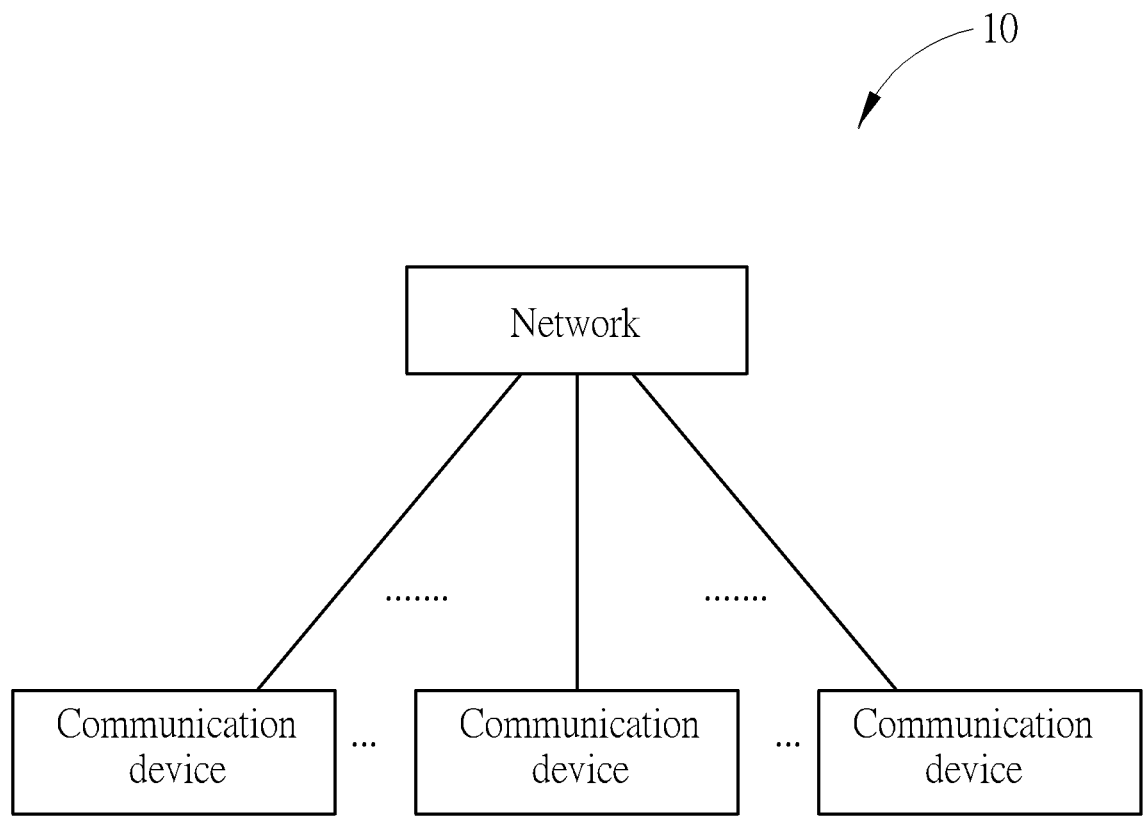
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via one or more cells on one or more carriers of licensed band(s) and/or unlicensed band(s). The one or more cells may be operated in the same or different frame structure types, or in the same or different duplexing modes, i.e. frequency-division duplexing (FDD) and time-division duplexing (TDD).

In FIG. 1, the network and the communication devices are simply utilized for illustrating the structure of the wireless communication system 10. The network may include a radio access network (RAN) including at least one base station (BS). Practically, the RAN may be a fifth generation (5G) network (or new radio (NR) RAN) network including at least one 5G BS (e.g., gNB). The RAN may be an evolved NR RAN or a sixth generation (6G) RAN which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the gNB, the 5G BS, an evolved gNB and a 6G BS. Furthermore, the network may also include a core network which includes network entities connecting to the RAN.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
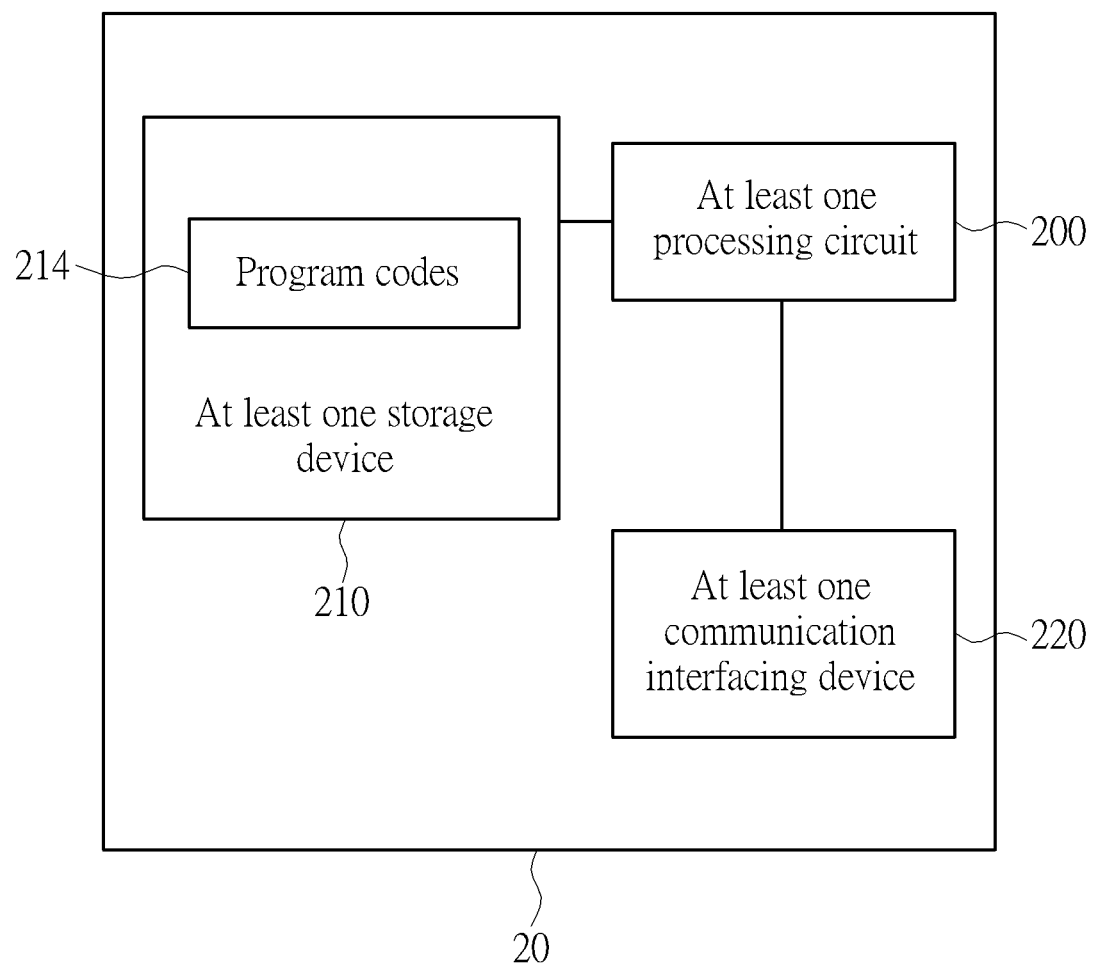
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the examples.

According to the prior art, a UE may have a valid physical UL control channel (PUCCH) resource for (e.g., a transmission of) a scheduling request (SR), and the valid PUCCH resource for the SR may be configured for a first logical channel. The UE may trigger a SR for/in a TTI due to data of a second logical channel available for a transmission. In this case, even though the UE has the valid PUCCH resource for the SR, but the UE cannot use the valid PUCCH resource to transmit the SR. In addition, the UE cannot initiate a random access procedure because the UE has the valid PUCCH resource for the SR as specified in a 3rd Generation Partnership Project (3GPP) Technical Specification 36.321 v14.2.0.

Figure 3:
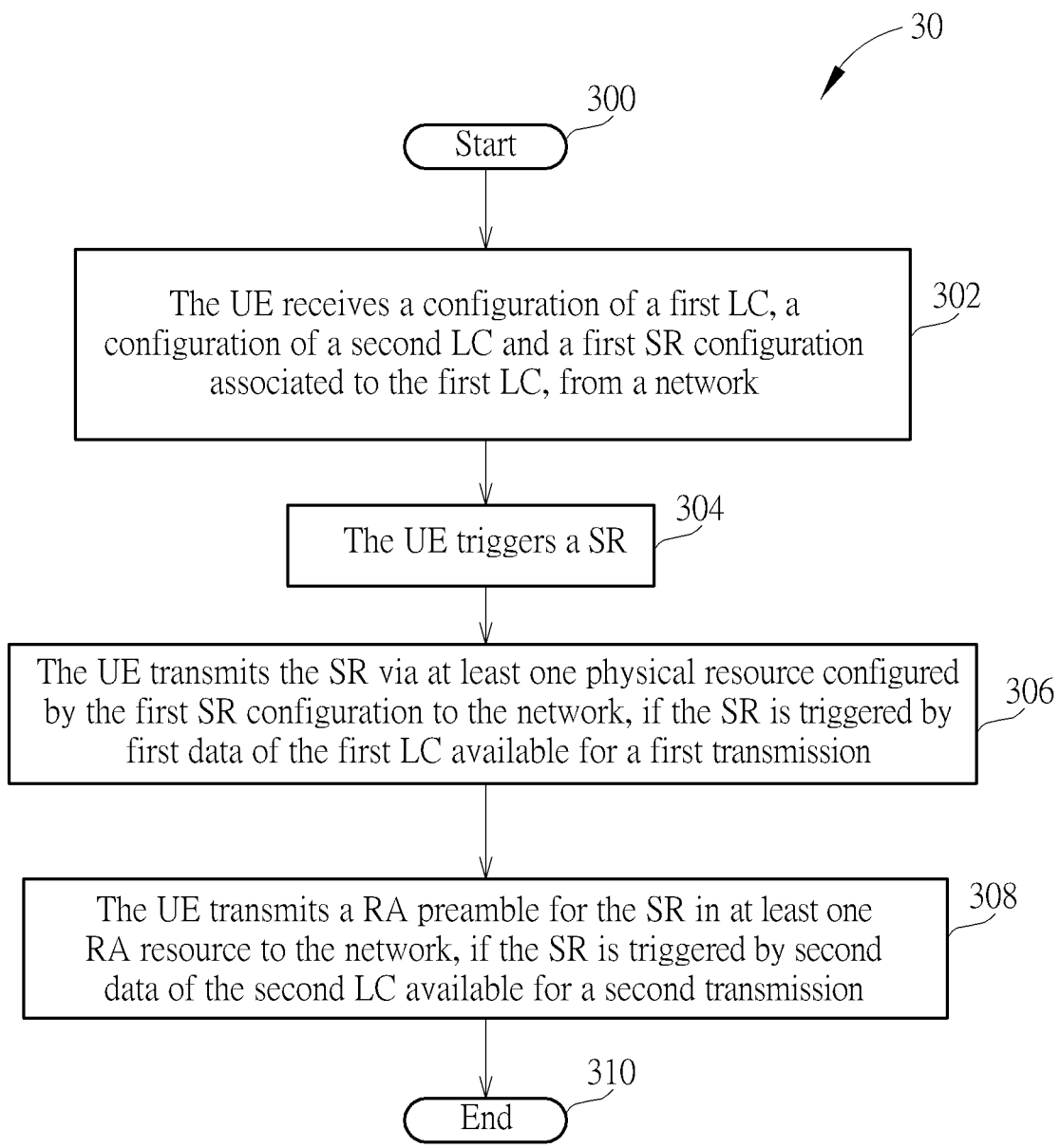
FIG. 3 is a flowchart of a process according to an example of the present invention.

A process 30 in FIG. 3 may be utilized in a UE, and includes the following steps:

Step 300: Start.

Step 302: The UE receives a configuration of a first logical channel (LC), a configuration of a second LC and a first SR configuration associated to the first LC, from a network.

Step 304: The UE triggers a SR.

Step 306: The UE transmits the SR via at least one physical resource configured by the first SR configuration to the network, if the SR is triggered by first data of the first LC available for a first transmission.

Step 308: The UE transmits a random access (RA) preamble for the SR in at least one RA resource to the network, if the SR is triggered by second data of the second LC available for a second transmission.

Step 310: End.

According to the process 30, the UE receives a configuration of a first LC, a configuration of a second LC, a first SR configuration associated to the first LC, from a network. The UE triggers a SR. The UE transmits the SR via (or in, or on) at least one physical resource configured by the first SR configuration (which is valid) to the network, if (or when, or wherein) the SR is triggered by first data of the first LC available for a first transmission. The UE transmits a random access (RA) preamble (e.g., for a RA procedure) for the SR in at least one RA resource to the network, if (or when, or wherein) the SR is triggered by second data of the second LC available for a second transmission. Thus, the problem that a RA procedure is prohibited by a (valid) PUCCH resource is solved.

In one example, the UE transmits the RA preamble for the SR, when the UE does not have a (valid) SR configuration associated to the second LC.

In one example, the UE determines (or select) the RA preamble according to a (physical) RA channel ((P)RACH) configuration received on a cell (e.g., a serving cell of the UE) from a BS (e.g., of the network). The (P)RACH configuration may indicate the at least one RA resource (e.g., time and/or frequency resource(s)) on which the UE transmits the RA preamble. The (P)RACH configuration may be broadcasted in system information (e.g., system information block (SIB)) by the network. In one example, the UE transmits the RA preamble on the cell to the BS, and receive a RA response (RAR) in response to the RA preamble on the cell from the BS. The UE may transmit a buffer status report (BSR) according to (e.g., using) a UL grant configured by (or included in) the RAR on the cell to the BS. The BSR may include/indicate a buffer size (e.g., data volume) of the second LC.

In one example, the UE keeps transmitting the SR on a cell to the BS via the at least one physical resource until the UE receives a UL grant on the cell or on another cell from the BS no matter which numerology (e.g., subcarrier spacing) and/or which TTI length is configured by the UL grant. For example, the UE receives a first UL grant associated to the second LC or a third LC (or not associated to the first LC), after transmitting the SR in one or more TTIs. The UE stops transmitting the SR via the at least one physical resource, when receiving the first UL grant from the BS. The UE may transmit a BSR to the BS according to the first UL grant.

In one example, the UE keeps transmitting the SR via the at least one physical resource until the UE receives a UL grant which configures a specific numerology and/or a specific TTI length. The specific numerology and/or the specific TTI length may be associated to the first LC. For example, the UE receives a first UL grant associated to the second LC or a third LC (or not associated to the first LC), after transmitting the SR in one or more TTIs via the at least one physical resource. The UE does not stop transmitting the SR, when receiving the first UL grant. The UE stops transmitting the SR, when the UE receives a second UL grant associated to the first LC. The UE may transmit a first BSR to the BS according to the second UL grant. The UE may transmit a second BSR to the BS according to the second UL grant.

In one example, the UE receives the first UL grant in a first DL control information (DCI) on a physical DL control channel (PDCCH). In one example, the UE receives the second UL grant in a second DCI on a PDCCH.

In one example, the UE receives the configuration of the first LC, the configuration of the second LC and the first SR configuration in one or more radio resource control (RRC) messages (e.g. RRC (Connection) Reconfiguration messages) or in one or more medium access control (MAC) control elements (CEs) from a network including one or more BSs.

In one example, the configuration of the first LC includes at least one of a LC identity of the first LC and a LC priority of the first LC. In one example, the configuration of the second LC includes at least one of a LC identity of the second LC and a LC priority of the second LC. For example, the configuration of the first LC is included in a first radio bearer (RB) configuration, and the configuration of the second LC is included in a second RB configuration. For example, the configuration of the first LC is associated to a first radio link control (RLC) configuration, and the configuration of the second LC is a second RLC configuration.

In one example, the least one physical resource comprises PUCCH resource(s) that the UE uses to transmit the SR. In one example, the at least one physical resource includes at least one of a time resource (e.g., with a periodicity, which OFDM symbol, which minislot, which slot or which subframe), a frequency resource (e.g., subcarriers) and a sequence (e.g., orthogonal code).

In one example, the UE receives a second SR configuration associated to the second LC, but the UE determines the second SR configuration is invalid or the UE releases the second SR configuration. In one example, the UE never receives the second SR configuration from the network. That is, there is no SR configuration associated to the second LC.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above process(es) may be compiled into the program codes 214.

To sum up, the present invention provides a method and related communication device for handling a SR. The communication device processes the SR and a RA preamble according to whether the SR and at least one physical resource belong to the same LC. As a result, the problem that a RA procedure is prohibited by a (valid) PUCCH resource is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a scheduling request (SR), comprising:
   at least one storage device; and
   at least one processing circuit, coupled to the at least one storage device, wherein the at least one storage device stores, and the at least one processing circuit is configured to execute instructions of:
   receiving a configuration of a first logical channel (LC), a configuration of a second LC and a first SR configuration associated to the first LC, from a network;
   triggering the SR;
   transmitting the SR via at least one physical resource configured by the first SR configuration to the network, if the SR is triggered by first data of the first LC available for a first transmission;
   transmitting a random access (RA) preamble for the SR in at least one RA resource to the network, if the SR is triggered by second data of the second LC available for a second transmission;
   receiving a RA response (RAR) in response to the RA preamble from the network; and
   transmitting a buffer status report (BSR) to the network using a uplink (UL) grant included in the RAR, wherein the BSR includes a buffer size of the second LC.

2. The communication device of claim 1, wherein the at least one physical resource comprises at least one physical UL control channel (PUCCH) resource.

3. The communication device of claim 1, wherein the instructions further comprise:
   selecting the RA preamble according to a RA channel (RACH) configuration received from the network.

4. The communication device of claim 1, wherein the instructions further comprise:
   keeping transmitting the SR to the network via the at least one physical resource configured by the first SR configuration until the communication device receives a UL grant from the network.

5. The communication device of claim 1, wherein the communication device receives the configuration of the first LC, the configuration of the second LC and the first SR configuration in at least one radio resource control (RRC) message or in at least one medium access control (MAC) control element (CE) from the network.

6. The communication device of claim 1, wherein the configuration of the first LC comprises at least one of a LC identity of the first LC and a LC priority of the first LC, and the configuration of the second LC comprises at least one of a LC identity of the second LC and a LC priority of the second LC.

7. A method for handling a scheduling request (SR) for a communication device, comprising steps of:
   receiving a configuration of a first logical channel (LC), a configuration of a second LC and a first SR configuration associated to the first LC, from a network;
   triggering the SR;
   transmitting the SR via at least one physical resource configured by the first SR configuration to the network, if the SR is triggered by first data of the first LC available for a first transmission;
   transmitting a random access (RA) preamble for the SR in at least one RA resource to the network, if the SR is triggered by second data of the second LC available for a second transmission;
   receiving a RA response (RAR) in response to the RA preamble from the network; and
   transmitting a buffer status report (BSR) to the network using an uplink (UL) grant included in the RAR, wherein the BSR includes a buffer size of the second LC.

8. The method of claim 7, wherein the at least one physical resource comprises at least one physical UL control channel (PUCCH) resource.

9. The method of claim 7, wherein the method further comprises:
   selecting the RA preamble according to a RA channel (RACH) configuration received from the network.

10. The method of claim 7, wherein the method further comprises:
    keeping transmitting the SR to the network via the at least one physical resource configured by the first SR configuration until the communication device receives a UL grant from the network.

11. The method of claim 7, wherein the communication device receives the configuration of the first LC, the configuration of the second LC and the first SR configuration in at least one radio resource control (RRC) message or in at least one medium access control (MAC) control element (CE) from the network.

12. The method of claim 7, wherein the configuration of the first LC comprises at least one of a LC identity of the first LC and a LC priority of the first LC, and the configuration of the second LC comprises at least one of a LC identity of the second LC and a LC priority of the second LC.

13. A communication device for handling a scheduling request (SR), comprising:
    at least one storage device; and
    at least one processing circuit, coupled to the at least one storage device, wherein the at least one storage device stores, and the at least one processing circuit is configured to execute instructions of:
    receiving a configuration of a first logical channel (LC), a configuration of a second LC and a first SR configuration associated to the first LC, from a network;
    triggering the SR;

transmitting the SR via at least one physical resource configured by the first SR configuration to the network, if the SR is triggered by first data of the first LC available for a first transmission;

transmitting a random access (RA) preamble for the SR in at least one RA resource to the network, if the SR is triggered by second data of the second LC available for a second transmission;

transmitting the SR to the network via the at least one physical resource until the communication device receives an uplink (UL) grant from the network no matter which numerology or which TTI length is configured by the UL grant.

14. The communication device of claim 13, wherein the instructions further comprise:

stopping transmitting the SR when receiving the uplink grant.

15. The communication device of claim 14, wherein the uplink grant is associated to the first LC or the second LC.

16. The communication device of claim 13, wherein the at least one physical resource comprises at least one physical UL control channel (PUCCH) resource.

17. The communication device of claim 13, wherein the instructions further comprise:

selecting the RA preamble according to a RA channel (RACH) configuration received from the network.

18. The communication device of claim 13, wherein the instructions further comprise:

receiving a RA response (RAR) in response to the RA preamble from the network.

19. The communication device of claim 13, wherein the communication device receives the configuration of the first LC, the configuration of the second LC and the first SR configuration in at least one radio resource control (RRC) message or in at least one medium access control (MAC) control element (CE) from the network.

* * * * *